US012618225B1

(12) United States Patent
Oyama et al.

(10) Patent No.: US 12,618,225 B1
(45) Date of Patent: May 5, 2026

(54) WORKING VEHICLE

(71) Applicant: TAKEUCHI MFG. CO., LTD.,
Hanishina-gun (JP)

(72) Inventors: Hidaka Oyama, Hanishina-gun (JP);
Keigo Kita, Hanishina-gun (JP)

(73) Assignee: TAKEUCHI MFG. CO., LTD.,
Hanishina-gun (JP)

( * ) Notice: Subject to any disclaimer, the term of this
patent is extended or adjusted under 35
U.S.C. 154(b) by 0 days.

(21) Appl. No.: 19/257,876

(22) Filed: Jul. 2, 2025

(30) Foreign Application Priority Data

Mar. 21, 2025 (JP) ................................. 2025-046389

(51) Int. Cl.
| | |
|---|---|
| *E02F 9/08* | (2006.01) |
| *B60L 1/00* | (2006.01) |
| *B60L 50/60* | (2019.01) |
| *E02F 3/32* | (2006.01) |
| *E02F 3/42* | (2006.01) |

(52) U.S. Cl.
CPC ............ *E02F 9/0866* (2013.01); *B60L 1/003*
(2013.01); *B60L 50/60* (2019.02); *E02F 3/425*
(2013.01); *B60L 2200/40* (2013.01); *E02F
3/325* (2013.01)

(58) Field of Classification Search
CPC ......... E02F 9/0866; E02F 3/425; E02F 3/325;
B60L 1/003; B60L 50/60; B60L 2200/40;
B60K 17/00; B60K 1/02; B60K 6/00
See application file for complete search history.

(56) References Cited

U.S. PATENT DOCUMENTS

| | | | | |
|---|---|---|---|---|
| 5,809,779 | A * | 9/1998 | Bruso ................... | E02F 9/0866 |
| | | | | 60/458 |
| 7,861,537 | B2 * | 1/2011 | Givens ................... | F02B 63/04 |
| | | | | 290/1 A |
| 8,100,210 | B2 * | 1/2012 | Takeuchi ............ | H01M 10/052 |
| | | | | 180/68.5 |
| 2005/0162208 | A1 * | 7/2005 | Zhang ................. | H03H 11/265 |
| | | | | 327/276 |

(Continued)

FOREIGN PATENT DOCUMENTS

| | | | | | |
|---|---|---|---|---|---|
| CN | 104691305 | A | * | 6/2015 | ........... F04D 29/668 |
| CN | 117818276 | A | * | 4/2024 | ............... B60K 1/00 |

(Continued)

OTHER PUBLICATIONS

Extended European Search Report dated Dec. 1, 2025, issued in
counterpart European application No. 25185546.6. (9 pages).

*Primary Examiner* — Paul N Dickson
*Assistant Examiner* — Shams Dhanani
(74) *Attorney, Agent, or Firm* — WHDA, LLP

(57) ABSTRACT

A working vehicle includes an upper body having a device
compartment, and a hydraulically operating working device,
the device compartment being provided with an electric
motor as a drive source of the working device, a driven
device driven by the electric motor, a motor bracket sup-
porting the electric motor, and a vehicle body-side bracket
supporting the motor bracket, the motor bracket being
installed to the vehicle body-side bracket via an anti-vibra-
tion support having an anti-vibration function and providing
support, at two parts of a lower part and one part of an upper
part, with at least two sets of the electric motor on one side
of a predetermined direction and the driven device on the
other side arranged one above the other.

7 Claims, 7 Drawing Sheets

(56) References Cited

U.S. PATENT DOCUMENTS

| | | | | |
|---|---|---|---|---|
| 2008/0120974 A1* | 5/2008 | Dong | B60K 17/043 | |
| | | | 60/464 | |
| 2010/0294577 A1* | 11/2010 | Shimomura | E02F 9/2075 | |
| | | | 180/68.5 | |
| 2012/0031689 A1* | 2/2012 | Kanno | B60K 1/00 | |
| | | | 180/65.1 | |
| 2012/0292124 A1* | 11/2012 | Yamashita | B62D 21/155 | |
| | | | 180/291 | |
| 2013/0119758 A1* | 5/2013 | Takamatsu | B60L 50/51 | |
| | | | 174/59 | |
| 2015/0068832 A1* | 3/2015 | Rumpel | B62D 65/02 | |
| | | | 180/69.4 | |
| 2015/0167274 A1 | 6/2015 | Harada et al. | | |
| 2016/0129774 A1* | 5/2016 | Shibata | B62D 25/082 | |
| | | | 180/297 | |
| 2017/0016206 A1* | 1/2017 | Ota | E02F 9/0858 | |
| 2018/0334205 A1* | 11/2018 | Warr | B62D 55/13 | |
| 2019/0176606 A1* | 6/2019 | Beckmann | F16F 13/108 | |
| 2019/0193546 A1* | 6/2019 | Kraft | B60G 3/20 | |
| 2021/0313860 A1* | 10/2021 | Jang | H02K 11/33 | |
| 2024/0271386 A1 | 8/2024 | Rudolf et al. | | |
| 2024/0424886 A1* | 12/2024 | Schmidt | B60K 17/342 | |
| 2025/0121669 A1* | 4/2025 | Boyd | B60K 5/00 | |
| 2025/0133996 A1* | 5/2025 | Kieke | B60K 7/0007 | |

FOREIGN PATENT DOCUMENTS

| | | | | |
|---|---|---|---|---|
| CN | 119593467 A | 3/2025 | | |
| EP | 4265852 A1 * | 10/2023 | | E02F 9/0858 |
| JP | 2023-23324 A | 2/2023 | | |
| WO | WO-2014016143 A2 * | 1/2014 | | F16F 15/08 |

* cited by examiner

REAR — LEFT
RIGHT — FRONT
UP
DOWN

UP

REAR   LEFT

RIGHT   FRONT

DOWN

UP

REAR — LEFT

RIGHT — FRONT

DOWN

UP

LEFT — FRONT

REAR — RIGHT

DOWN

UP
LEFT     FRONT
REAR     RIGHT
DOWN

REAR

RIGHT ←—→ LEFT

FRONT

WORKING VEHICLE

CROSS-REFERENCE TO RELATED APPLICATION

This application is based upon and claims the benefit of priority of the prior Japanese Patent Application No. P2025-046389, filed on Mar. 21, 2025, and the entire contents of which are incorporated herein by reference.

TECHNICAL FIELD

The present invention relates to a working vehicle.

BACKGROUND ART

As an example of a working vehicle, a hydraulic excavator, a track loader or the like having a lower body with a traveling crawler or tire installed thereon, an upper body arranged above the lower body, and a working device installed at the lower body or the upper body and operating hydraulically (that is, with hydraulic oil having a predetermined pressure) is known according to the related art.

Recently, a working vehicle having an electric motor instead of a traditional engine as a drive source of a working device has been developed (see JP-A-2023-23324).

SUMMARY OF INVENTION

Technical Problem

In the working vehicle having the electric motor, for example, a configuration including a plurality of (two and so on) electric motors as the drive source is assumed in order to achieve a larger size and a higher output of the working device or for other reasons.

Solution to Problem

With respect to the above-described working vehicle, the present inventor has intensively studied the configuration including a plurality of (for example, two) electric motors, taking a configuration including one electric motor as the drive source, as a comparative example, and as a result, the following problems have become apparent.

Normally, as the working vehicle becomes smaller, the space where a device is installed becomes narrower. Therefore, in the case of the configuration including two electric motors, the problem of it being difficult to horizontally arrange the electric motors has become apparent. Therefore, a configuration in which two electric motors are vertically arranged has been examined.

Also, in the working vehicle according to the comparative example, a motor bracket that supports one electric motor is configured to be installed on the vehicle body side via an anti-vibration support (a member having an anti-vibration function and providing support, and in some cases, referred to simply as an "anti-vibration support" in the present application) at four parts on the lower side. However, as the result of an examination about the configuration in which two electric motors are vertically arranged with a similar installation structure, the problem of an increase in the vibration due to the operation of the vehicle at an upper part of the configuration, posing a risk that sufficient vibration isolation may not be able to be performed, has become apparent.

Moreover, the problem of a reduction in workability in the case of assembling a driven device (hydraulic pump or the like) to the electric motor in the manufacturing line because of the narrow space where a device is installed in the vehicle body has become apparent.

The present invention has been accomplished under the above-described circumstances and an object thereof is to provide a working vehicle that has a configuration in which at least two electric motors are arranged one above the other and that can enhance the anti-vibration property at the time of operation and can also enhance assemblability at the time of manufacturing.

The present invention solves the above-described problems by a solution as described below as an embodiment.

A working vehicle according to an embodiment is a working vehicle including an upper body having a device compartment, and a hydraulically operating working device, and the device compartment is provided with an electric motor serving as a drive source of the working device, a driven device driven by the electric motor, a motor bracket supporting the electric motor, and a vehicle body-side bracket supporting the motor bracket, and the motor bracket is configured to be installed to the vehicle body-side bracket via an anti-vibration support having an anti-vibration function and providing support, at a predetermined part of a lower part that is at a relatively lower position in a vertical direction and a predetermined part of an upper part that is at a relatively upper position in the vertical direction, in a state where at least two sets of the electric motor arranged on one side of a predetermined direction and the driven device arranged on the other side of the predetermined direction are arranged at a relatively upper position in the vertical direction and a relatively lower position in the vertical direction.

Advantageous Effects of Invention

In the working vehicle according to the embodiment, a configuration in which at least two electric motors are arranged one above the other can be employed. Also, the anti-vibration property at the time of operation of the vehicle can be enhanced. Moreover, assemblability at the time of manufacturing the vehicle can be enhanced.

DESCRIPTION OF EMBODIMENTS

Figure 1:
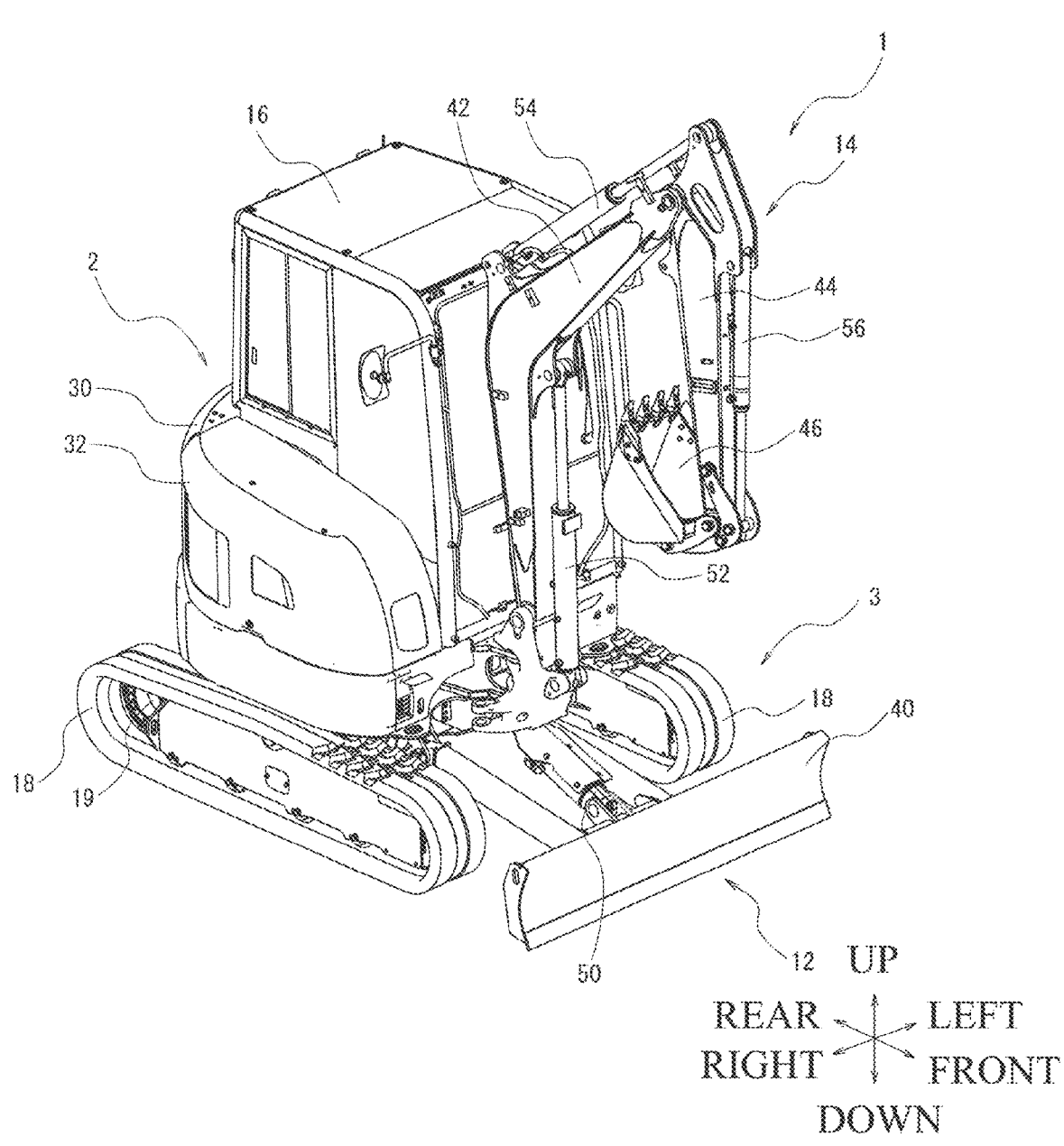
FIG. 1 is a perspective view showing an example of a working vehicle according to an embodiment of the present invention.

Hereinafter, an embodiment of the present invention will be described in detail with reference to the drawings. FIG.

1 is a schematic view (perspective view from above a right front part) showing an example of a working vehicle 1 according to the present embodiment. Also, FIG. 2 is a perspective view (perspective view from above a right front part) showing an example of an upper body 2 (in a state where a cover 32 is removed) of the working vehicle 1 shown in FIG. 1. For the sake of convenience of description, there are cases where upward and downward, left and right, and forward and backward directions are indicated by arrows in the drawings. Also, there are cases where members having the same function are denoted by the same sign in all the drawings for illustrating the embodiment and the repeated description thereof is omitted.

First, the overall configuration of the working vehicle 1 will be described. A hydraulic excavator will be described as an example of the working vehicle 1. However, the working vehicle 1 is not limited to the hydraulic excavator.

Figure 2:
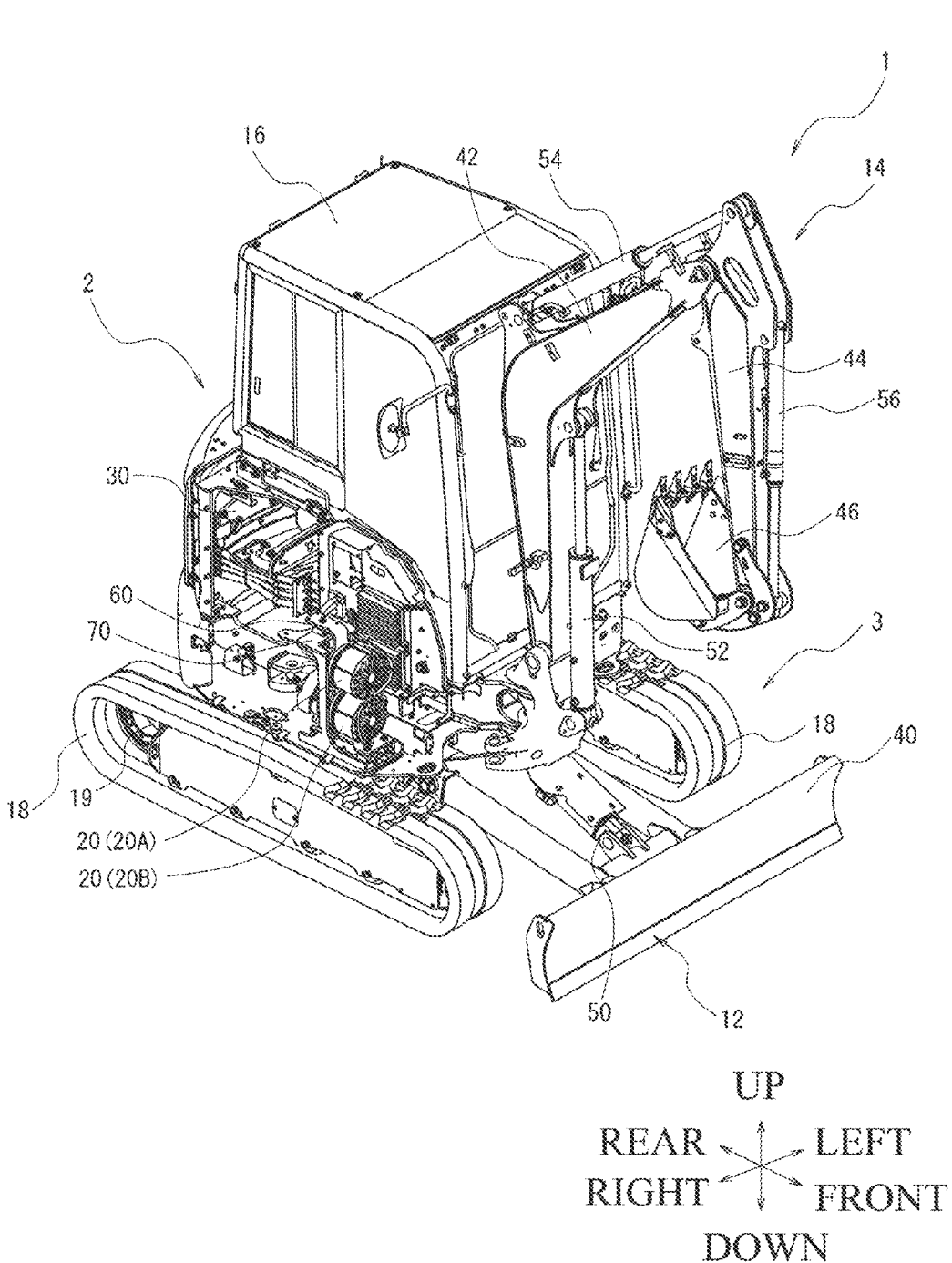
FIG. 2 is a perspective view showing an example of an upper body of the working vehicle shown in FIG. 1.

As shown in FIG. 1, the working vehicle 1 has a lower body 3 provided with a traveling device, and the upper body 2 arranged above the lower body 3. This working vehicle 1 has working devices 12, 14 that operate hydraulically (with hydraulic oil having a predetermined pressure). Also, a cab 16 provided with an operation device with which an operator on board carries out operations for traveling and work is provided. The cab 16 is assumed to be a closed type (cabin) but may also be an open type (canopy).

As an example of the traveling device of the lower body 3, a pair of left and right crawlers 18 are provided. However, the traveling device of the lower body 3 is not limited to the crawlers 18 and may employ a configuration having tires instead of the crawlers 18 (not illustrated). The crawlers 18 are driven by a traveling hydraulic motor 19.

As an example of the working device 12, a blade 40 is provided. The blade 40 is installed at the lower body 3 so as to be able to swing upward and downward (including forward and backward components). The blade 40 is driven by a hydraulic cylinder (blade cylinder) 50. However, the working device 12 is not limited to the above-described configuration.

As an example of the working device 14, a boom 42, an arm 44, and an attachment (in the present embodiment, a bucket) 46 are provided. However, the attachment 46 is not limited to the bucket. The boom 42 is installed at the upper body 2 so as to be able to swing upward and downward (including forward and backward components) (a boom bracket may or may not be provided in between). The arm 44 is installed at the boom 42 so as to be able to swing upward and downward (including forward and backward components). The attachment 46 is installed at the arm 44 so as to be able to swing upward and downward (including forward and backward components). The boom 42 is driven by a hydraulic cylinder (boom cylinder) 52. The arm 44 is driven by a hydraulic cylinder (arm cylinder) 54. The attachment 46 is driven by a hydraulic cylinder (bucket cylinder) 56. However, the working device 14 is not limited to the above-described configuration.

The working vehicle 1 has a drive source 20, a hydraulic pump 80 as a driven device driven by the drive source 20, a control valve and the like, as a drive mechanism for driving the above-described traveling hydraulic motor 19 and hydraulic cylinders 50, 52, 54, 56. One or a plurality of hydraulic pumps 80 are provided in accordance with the configurations of the working devices 12, 14 or the traveling device or the like, or loads or the like.

In the working vehicle 1 having the above-described configuration, the operator operates the operation device and thus performs control to activate the control valve to supply hydraulic oil with a predetermined pressure sent out from the hydraulic pump 80 to the traveling hydraulic motor 19 and the hydraulic cylinders 50, 52, 54, 56. Thus, the traveling of the working vehicle 1 and the work by the working devices 12, 14 can be performed.

Also, in the present embodiment, an electric motor is provided as the above-described drive source 20. The specifications of this electric motor 20, that is, the number of electric motors 20 and the rated output thereof or the like, are set as appropriate in accordance with the number of the above-described hydraulic pumps 80 and the rate output thereof or the like. Here, a configuration in which a plurality of (for example, two) electric motors 20 are provided is described as an example. However, this configuration is not limiting and a configuration in which three or more electric motors 20 are provided may be employed (not illustrated).

As shown in FIG. 1 and FIG. 2, the working vehicle 1 according to the present embodiment has, in the upper body 2, a device compartment 30 where the electric motor 20 or the like is installed, and the cover 32 covering the opening of the device compartment 30 so as to be able to open and close (FIG. 2 shows a state where the cover 32 is removed). A battery (for example, a lithium-ion rechargeable battery) or the like that supplies electric power for driving the electric motor 20 is installed in a rear part of the device compartment 30 (not illustrated).

Figure 3:
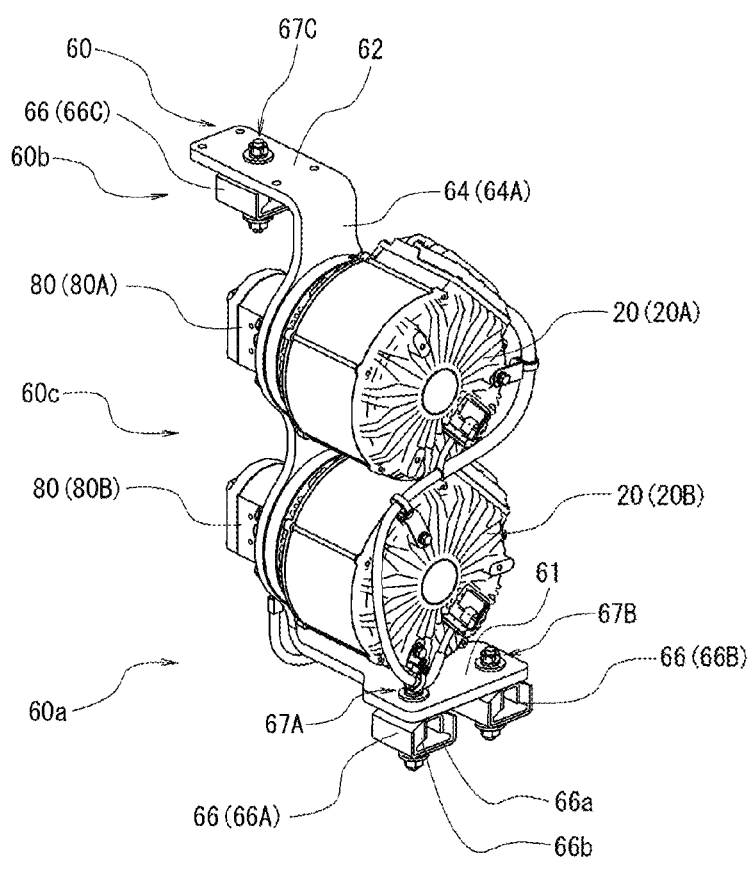
FIG. 3 is a perspective view showing an example of a motor bracket of the working vehicle shown in FIG. 1.
Figure 3:
Figure 4:
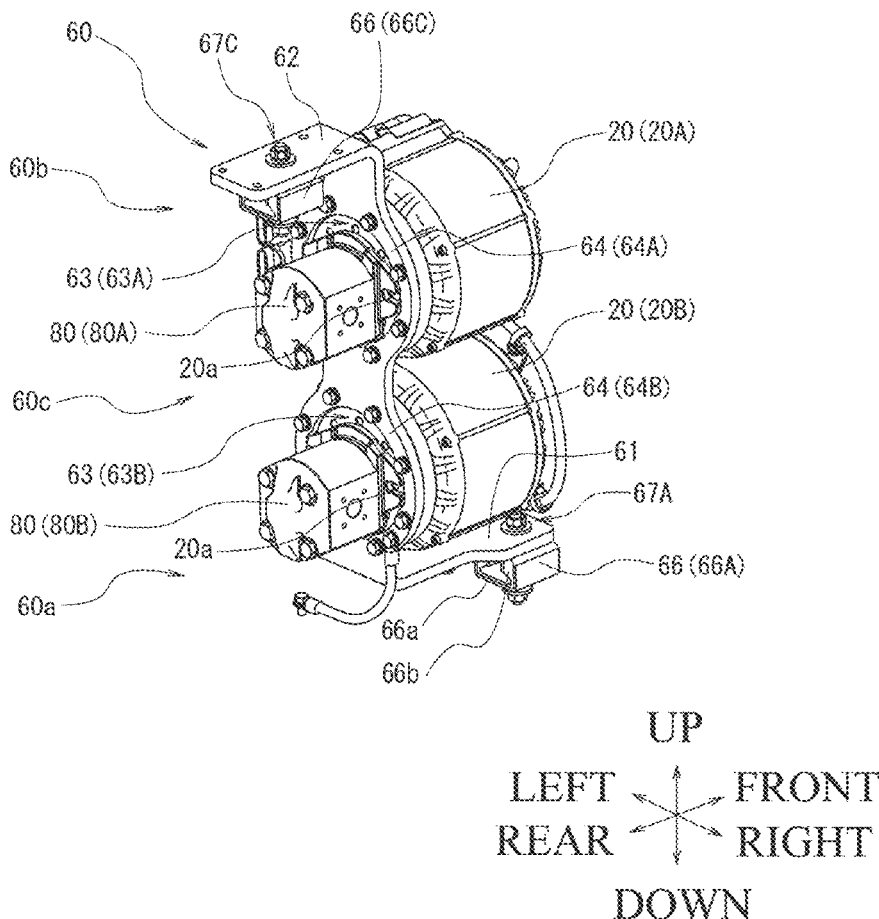
FIG. 4 is a perspective view showing an example of the motor bracket of the working vehicle shown in FIG. 1.
Figure 5:
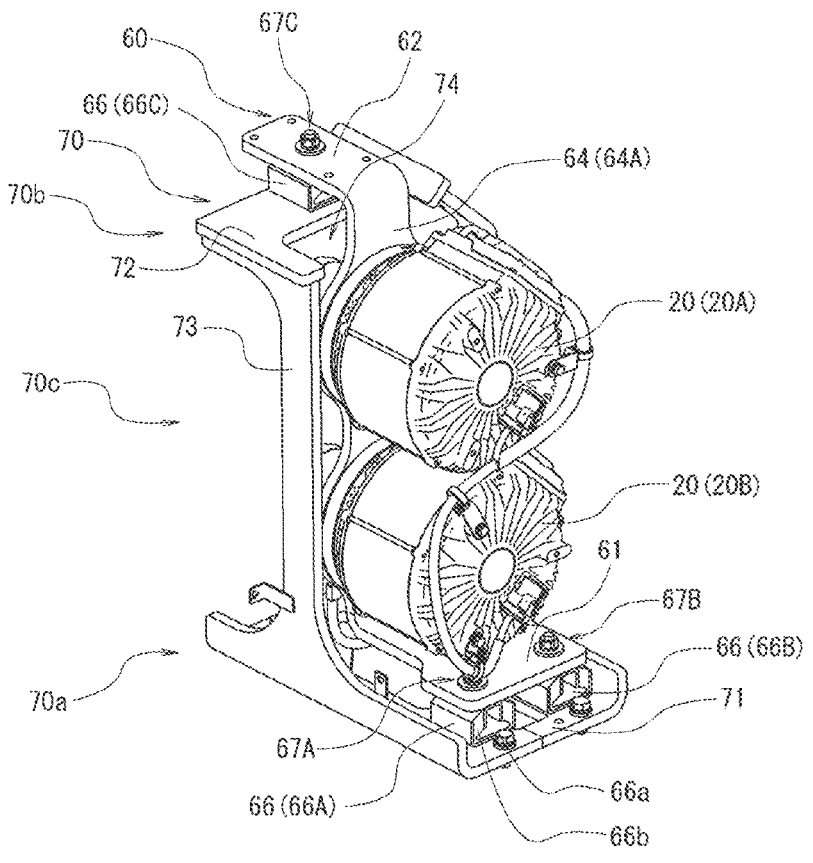
FIG. 5 is a perspective view showing an example of the motor bracket and a vehicle body-side bracket of the working vehicle shown in FIG. 1.
Figure 5:
Figure 6:
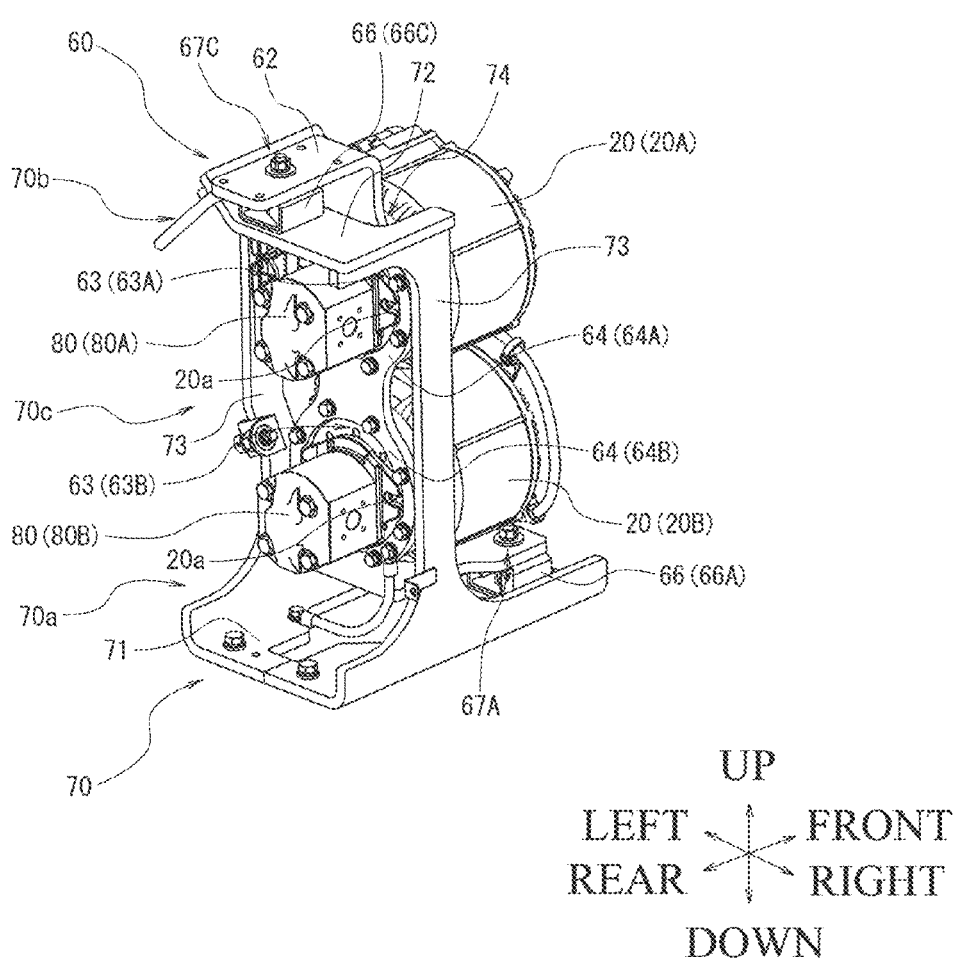
FIG. 6 is a perspective view showing an example of the motor bracket and the vehicle body-side bracket of the working vehicle shown in FIG. 1.

Next, a configuration for installing the electric motor 20 in the upper body 2 will be described in detail. The working vehicle 1 according to the present embodiment has a motor bracket 60 supporting the electric motor 20, and a vehicle body-side bracket 70 installed at the upper body 2 and supporting the motor bracket 60. Here, FIG. 3 is a perspective view (schematic view) from above a right front part showing an example of the motor bracket 60, and FIG. 4 is a perspective view (schematic view) from above a right rear part (both showing a state where the electric motor 20 and the driven device 80 are fixed). FIG. 5 is a perspective view (schematic view) from above a right front part showing an example of the motor bracket 60 and the vehicle body-side bracket 70, and FIG. 6 is a perspective view (schematic view) from above a right rear part (both showing a state where the motor bracket 60 shown in FIG. 3 and FIG. 4 is fixed).

The motor bracket 60 according to the present embodiment is formed, for example, using a plate-shaped steel material. Specifically, the motor bracket 60 has a lower part 60a at a relatively lower position in the vertical direction, an upper part 60b at a relatively upper position in the vertical direction, and a center part 60c at a position relatively between the lower part 60a and the upper part 60b in the vertical direction. Also, the lower part 60a is provided with a lower support part 61 extended (bent) to one side (to be the front side when installed in the upper body 2) from the center part 60c. Also, the upper part 60b is provided with an upper support part 62 extended (bent) to the other side (to be the rear side when installed in the upper body 2) from the center part 60c. That is, the motor bracket 60 is formed in a Z-shape (including a shape such that the center part 60c is erected parallel to the vertical direction as in the present embodiment) as viewed in a side view (in the present embodiment, when viewed from the right side of the upper body 2). Also, the plate surface of the center part 60c is provided with a through hole 63 formed to allow the insertion of a drive shaft (not illustrated) of the electric motor 20 and to expose a driven device coupling part 20a of the electric motor 20. Also, a fixing part 64 fixing the electric motor 20, using a bolt or the like, is provided at a peripheral position surrounding the through hole 63.

The electric motor 20 is arranged on one side of the above-described motor bracket 60, and the driven device 80 driven by the electric motor 20 is arranged on the other side. Specifically, the electric motor 20 is fixed to the fixing part 64 in a state where the drive shaft or the like of the electric motor 20 is inserted from one side to the other side of the through hole 63. Moreover, the driven device 80 is fixed to the driven device coupling part 20a of the electric motor 20 exposed inside the through hole 63. In this way, a state where the electric motor 20 and the driven device 80 are supported by the motor bracket 60 is generated.

The present embodiment is an example of a configuration in which two sets of the electric motor 20 and the driven device 80 are arranged at a relatively upper position in the vertical direction and a relatively lower position in the vertical direction. That is, the electric motor 20 (20A) and the driven device 80 (80A) on the upper side are fixed at the positions of the through hole 63 (63A) and the fixing part 64 (64A). Also, the electric motor 20 (20B) and the driven device 80 (80B) on the lower side are fixed at the positions of the through hole 63 (63B) and the fixing part 64 (64B) (this state is referred to as an assembly state). This is similarly applicable to a configuration in which three sets or more are arranged from a relatively upper position in the vertical position to a relatively lower position in the vertical direction (not illustrated).

As described above, as an example, the driven device 80 is a hydraulic pump that sends out hydraulic oil with a predetermined pressure which causes the working devices 12, 14 or a traveling device, a slewing device or the like to operate. Alternatively, as another example, the driven device 80 is the compressor of an air conditioner that performs air conditioning in the cab 16. However, the driven device 80 is not limited to these examples.

Next, the vehicle body-side bracket 70 according to the present embodiment is formed, for example, using a plate-shaped steel material. Specifically, a lower part 70a at a relatively lower position in the vertical direction is provided with a frame-shaped (or may be planar) lower support part 71. Also, an upper part 70b at a relatively upper position in the vertical direction is provided with a planar (or may be frame-shaped) upper support part 72. Also, a center part 70c at a position relatively between the lower part 70a and the upper part 70b in the vertical direction is provided with two support pillars 73 coupling the lower support part 71 and the upper support part 72. As an example, the vehicle body-side bracket 70 is fixed to the upper body 2, using bolts at four parts of the lower part 70a.

The motor bracket 60 in the assembly state is configured to be installed to the above-described vehicle body-side bracket 70 via anti-vibration supports 66 (66A, 66B) provided at a predetermined part (in the present embodiment, two parts 67A, 67B) of the lower part 60a that is at a relatively lower position in the vertical direction and an anti-vibration support 66 (66C) provided at a predetermined part (in the present embodiment, one part 67C) of the upper part 60b that is at a relatively upper position in the vertical direction. However, the predetermined part of the lower part 60a and the predetermined part of the upper part 60b are not limited to the above-described configuration.

Here, the vehicle body-side bracket 70 is provided with a cut-out part 74 that allows the entry of the motor bracket 60, at the upper support part 72 of the upper part 70b. In the present embodiment, the motor bracket 60 in the assembly state (the state where the electric motor 20 and the driven device 80 are installed) is installed to the vehicle body-side bracket 70. In the actual process, the work of lowering the motor bracket 60 that is lifted up and then installing the motor bracket 60 takes place. At this time, with the above-described configuration, the driven device (in the case of the present embodiment, the hydraulic pump) 80 can be passed to the position where the cut-out part 74 is provided. Therefore, the driven device (in the case of the present embodiment, the hydraulic pump) 80 can be prevented from colliding with the upper support part 72 of the vehicle body-side bracket 70 and thus being damaged.

As an example, the anti-vibration supports 66 (66A, 66B, 66C) have a support metal fitting 66a that is formed using a metal material and performs coupling and support, and an anti-vibration rubber 66b that is formed using a rubber or an elastomer material and performs vibration damping (vibration isolation).

As described above, if the motor bracket 60 having the configuration in which two sets of the electric motor 20 and the driven device 80 are provided in parallel one above the other is installed on the vehicle body side via anti-vibration supports at four parts on the lower side as in the working vehicle according to the comparative example, there is a problem in that sufficient vibration isolation cannot be performed because the vibration due to the operation of the vehicle increases at the upper part of the configuration. In contrast, with the above-described configuration, this problem can be solved, that is, the vibration of the upper part 60b due to the operation of the vehicle can be suppressed and sufficient vibration isolation can be performed.

Also, the motor bracket 60 in the assembly state where two sets of the electric motor 20 and the driven device 80 are provided in parallel one above the other can be installed to the vehicle body-side bracket 70. Thus, workability (assemblability) is significantly improved as compared with the method in which the electric motor and the driven device are installed in order on the manufacturing line as in the related art.

Figure 7:
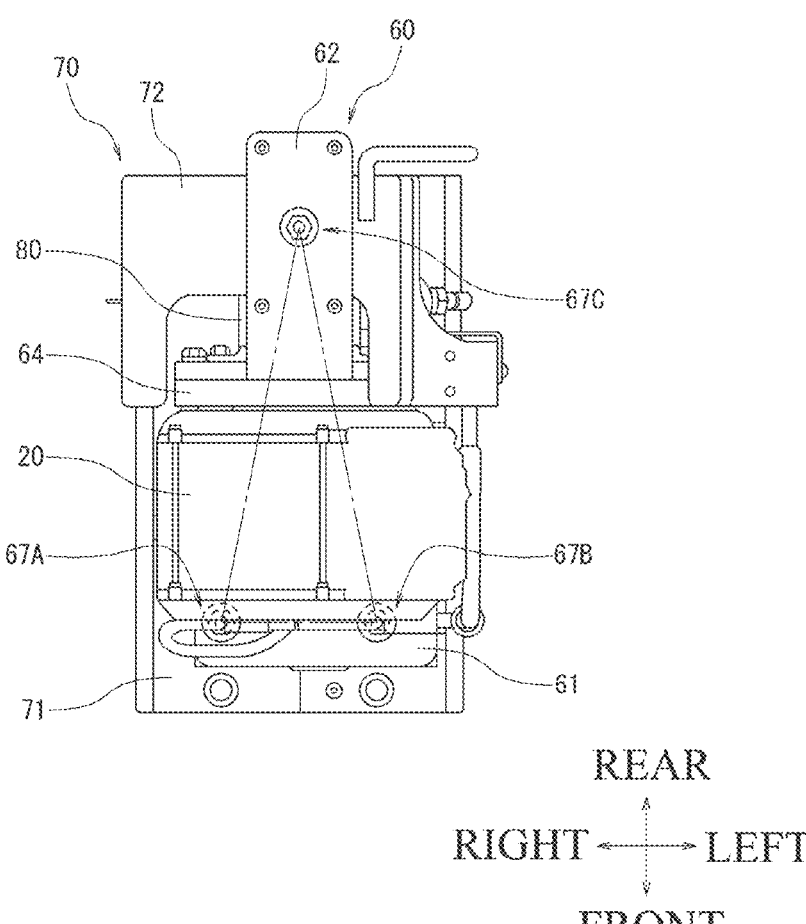
FIG. 7 is an illustrative view (plan view) for illustrating an arrangement of an anti-vibration support in the working vehicle shown in FIG. 1.

Also, as a characteristic configuration in the present embodiment, as shown in FIG. 7, the above-described anti-vibration supports 66 (66A, 66B, 66C) at the three parts in total are arranged in the shape of an isosceles triangle (indicated by a dash-dotted line in FIG. 7) in which the position of the anti-vibration support 66 (66C) provided at the one part 67C of the upper part 60b is the vertex in a plan view. Thus, when the working vehicle 1 operates, a vibration or a force is applied to the motor bracket 60 from the side of the vehicle body (upper body 2), but the risk of deformation of the motor bracket 60 due to the vibration or the force can be reduced. This is because the arrangement in the shape of an isosceles triangle provides a configuration that is even in the left-and-right direction and therefore improves the strength against vibration particularly in the left-and-right direction.

Also, the anti-vibration supports 66 (66A, 66B) provided at the two parts 67A, 67B of the lower part 60a are configured to be arranged at positions below the electric motor 20 on one side of the motor bracket 60 (the above-described electric motor 20 fixing side). Thus, a configuration in which any anti-vibration support is arranged at a position below the driven device 80 (particularly the hydraulic pump) can be eliminated (avoided). Therefore, the deterioration of the anti-vibration rubber due to the hydraulic oil leaking from the hydraulic pump and dripping on the anti-vibration support can be prevented.

Also, the anti-vibration support 66 (66C) provided at the one part 67C of the upper part 60b is configured to be arranged at a position above the driven device 80 on the other side of the motor bracket 60 (the above-described driven device 80 fixing side). Thus, the support points do not concentrate on one side of the motor bracket 60 in the assembly state and a wide support spacing (forward and backward) can be provided, and therefore support can be performed in a more stable state.

The other mechanisms for traveling and work in the working vehicle 1 according to the present embodiment are similar to those in a known working vehicle (hydraulic excavator) and therefore the detailed description thereof is omitted.

As described above, it is preferable that the present invention includes the configurations given below.

(1) A working vehicle according to an embodiment is a working vehicle including an upper body having a device compartment, and a hydraulically operating working device, and the device compartment is provided with an electric motor serving as a drive source of the working device, a driven device driven by the electric motor, a motor bracket supporting the electric motor, and a vehicle body-side bracket supporting the motor bracket, and the motor bracket is configured to be installed to the vehicle body-side bracket via an anti-vibration support having an anti-vibration function and providing support, at a predetermined part of a lower part that is at a relatively lower position in a vertical direction and a predetermined part of an upper part that is at a relatively upper position in the vertical direction, in a state where at least two sets of the electric motor arranged on one side of a predetermined direction and the driven device arranged on the other side of the predetermined direction are arranged at a relatively upper position in the vertical direction and a relatively lower position in the vertical direction.

(2) In the working vehicle according to the above aspect (1), it is preferable that the predetermined part of the lower part is two parts and that the predetermined part of the upper part is one part.

(3) In the working vehicle according to the above aspect (2), it is preferable that the anti-vibration supports at the three parts in total are arranged in the shape of an isosceles triangle in which the one part of the upper part is a vertex in a plan view.

(4) In the working vehicle according to the above aspect (2) or (3), it is preferable that the anti-vibration supports at the two parts of the lower part are configured to be arranged below the electric motor on the one side of the motor bracket.

(5) In the working vehicle according to any one of the above aspects (2) to (4), it is preferable that the anti-vibration support at the one part of the upper part is configured to be arranged above the driven device on the other side of the motor bracket.

(6) In the working vehicle according to any one of the above aspects (1) to (5), it is preferable that the motor bracket has a Z-shape as viewed in a side view.

(7) In the working vehicle according to any one of the above aspects (1) to (6), it is preferable that the vehicle body-side bracket has a cut-out part that allows entry of the motor bracket, at a relatively upper position in the vertical direction.

According to the present invention, in a working vehicle having an electric motor, a configuration in which a plurality of (at least two) electric motors are arranged one above the other can be employed. Also, the anti-vibration property at the time of operation of the vehicle can be enhanced. Moreover, assemblability at the time of manufacturing the vehicle can be enhanced.

The present invention is not limited to the above-described embodiment (hydraulic excavator). For example, while a hydraulic excavator has been described as an example of the working vehicle, the present invention can be similarly applied to a track loader or the like in which an upper body does not slew in relation to a lower body. Also, while a configuration in which two sets of an electric motor and a driven device are provided in parallel one above the other has been described as an example, the present invention can be similarly applied to a configuration in which three sets or more are provided in parallel one above another.

What is claimed is:

1. A working vehicle comprising an upper body having a device compartment, and a hydraulically operating working device, wherein the device compartment is provided with an electric motor serving as a drive source of the working device, a driven device driven by the electric motor, a motor bracket supporting the electric motor, and a vehicle body-side bracket supporting the motor bracket, and the motor bracket is configured to be installed to the vehicle body-side bracket via an anti-vibration support for supporting the electric motor with an anti-vibration function, at a predetermined part of a lower part that is at a relatively lower position in a vertical direction and a predetermined part of an upper part that is at a relatively upper position in the vertical direction, in a state where at least two sets of the electric motor arranged on one side of a predetermined direction and the driven device arranged on the other side of the predetermined direction are arranged at a relatively upper position in the vertical direction and a relatively lower position in the vertical direction.

2. The working vehicle according to claim 1, wherein the predetermined part of the lower part is two parts, and the predetermined part of the upper part is one part.

3. The working vehicle according to claim 2, wherein the anti-vibration supports at the three parts in total are arranged in the shape of an isosceles triangle in which the one part of the upper part is a vertex, in a plan view.

4. The working vehicle according to claim 2, wherein the anti-vibration supports at the two parts of the lower part are configured to be arranged below the electric motor on the one side of the motor bracket.

5. The working vehicle according to claim 2, wherein the anti-vibration support at the one part of the upper part is configured to be arranged above the driven device on the other side of the motor bracket.

6. The working vehicle according to claim 1, wherein the motor bracket has a Z-shape in a side view.

7. The working vehicle according to claim 1, wherein the vehicle body-side bracket has a cut-out part that allows entry of the motor bracket at an upper part that is at a relatively upper position in the vertical direction.

* * * * *